United States Patent
Mauldin

(10) Patent No.: US 8,722,570 B2
(45) Date of Patent: May 13, 2014

(54) COBALT CATALYST WITH IMPROVED ACTIVITY MAINTENANCE

(75) Inventor: Charles H. Mauldin, Fredericksburg, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 485 days.

(21) Appl. No.: 12/287,543

(22) Filed: Oct. 10, 2008

(65) Prior Publication Data

US 2009/0111899 A1    Apr. 30, 2009

Related U.S. Application Data

(60) Provisional application No. 61/000,569, filed on Oct. 26, 2007.

(51) Int. Cl.
*B01J 23/00*    (2006.01)

(52) U.S. Cl.
USPC ........... 502/350; 502/351; 502/326; 502/332; 518/715

(58) Field of Classification Search
USPC ........... 502/429, 332, 326, 350–351; 518/715
See application file for complete search history.

(56) References Cited

U.S. PATENT DOCUMENTS

| | | |
|---|---|---|
| 3,919,119 A | 11/1975 | Romanski et al. |
| 5,140,050 A | 8/1992 | Mauldin et al. |
| 5,348,982 A | 9/1994 | Herbolzheimer et al. |
| 5,856,260 A | 1/1999 | Mauldin |
| 5,856,261 A | 1/1999 | Culross et al. |
| 5,863,856 A | 1/1999 | Mauldin |
| 6,117,814 A | 9/2000 | Plecha et al. |
| 6,124,367 A | 9/2000 | Plecha et al. |
| 7,253,136 B2 | 8/2007 | Mauldin et al. |
| 2004/0204506 A1 | 10/2004 | Mauldin et al. |
| 2005/0272827 A1 | 12/2005 | Lok |

FOREIGN PATENT DOCUMENTS

| | | |
|---|---|---|
| EP | 0 266 898 B1 | 5/1988 |
| EP | 0 370 757 A1 | 11/1988 |
| EP | 0 319 625 A1 | 6/1989 |
| WO | WO 2004/028687 A1 | 4/2004 |

OTHER PUBLICATIONS

Rachid Oukaci, et al., "Comparison of Patented Co F-T Catalysts Using Fixed-Bed and Slurry Bubble Column Reactors", *Applied Catalysis A: General* 186 (1999), pp. 129-144.

Jiang, Chong; He, Houkang; Wu, Wenhua; Zhang, Yu; Chen, Yanmo; Zhu, Meifang CS, "Study on surface treatment of titania nanoparticles and dispersion behavior", China Synthetic Fiber Industry, vol. 26 No. 3 Jun. 2003, pp. 12-14, ISSN/ISBN: 1001-0041.

*Primary Examiner* — Kaj K Olsen
*Assistant Examiner* — Pritesh Darji
(74) *Attorney, Agent, or Firm* — David M. Weisberg; Joseph J. Dvorak

(57) ABSTRACT

The present invention provides a catalyst comprising a catalytic metal, preferably cobalt, rhenium or mixtures thereof. The catalytic metal is supported on a support comprising a major amount of titania and a minor amount of cobalt aluminate derived from anatase titania. The support also includes a minor amount of titania derived from a titanium chelate.

5 Claims, No Drawings

COBALT CATALYST WITH IMPROVED ACTIVITY MAINTENANCE

This application claims benefit of Provisional Application 61/000,569 filed Oct. 26, 2007

FIELD OF THE INVENTION

The present invention relates to catalysts comprising cobalt supported on a titania and cobalt aluminate support. It also relates to a method for improving the activity maintenance of such catalysts and use thereof in hydrocarbon synthesis.

BACKGROUND OF THE INVENTION

Catalysts comprising cobalt on a support such as silica or alumina are known to be useful in hydrogenation reactions such as hydrogenating aldehydes and nitriles. They are also used in hydrocarbon synthesis via the Fischer-Tropsch process.

Promoter metals, such as rhenium, zirconium, manganese and the like, are commonly used with cobalt to improve various aspects of catalytic performance.

In the case of the Fischer-Tropsch hydrocarbon synthesis process, especially ashen conducted in a slurry bubble column reactor, the preferred catalyst comprises cobalt supported on a titania support. Generally, the titania in such catalysts is in its rutile form.

In US Patent Publication 2004/0204506 A1, which is incorporated herein in its entirety, there is disclosed an improved catalyst support comprising primarily titania, converted from its anatase form to its rutile form, and a minor amount of a binder comprising cobalt aluminate. The cobalt aluminate is incorporated in the rutile titania support by forming the titania support with an alumina binder and thereafter reacting the alumina binder with a sufficient amount of a cobalt compound to convert at least part and preferably substantially all of the alumina to cobalt aluminate. Typically, a small amount of cobalt titanate is formed as well. For convenience, this support is referred to herein as the "titanate support." Catalysts comprising cobalt, rhenium or a mixture thereof on the "titanate support" have demonstrated improved selectivity for producing higher hydrocarbons in the Fischer-Tropsch process.

SUMMARY OF THE INVENTION

It has now been discovered that the activity maintenance of a catalyst comprising cobalt on the "titanate support" is improved by incorporating into the catalyst a minor amount of $TiO_2$ derived from a titanium chelate. The $TiO_2$ derived from a titanium chelate may be incorporated into the catalyst before loading the catalytic metals onto the "titanate support" or during the loading of the catalytic metals onto the "titanate support."

Accordingly, in one embodiment of the invention, there is provided a catalyst comprising: a catalytic metal, preferably cobalt, rhenium or mixtures thereof; a catalyst support comprising a major amount of titania and a minor amount of cobalt aluminate derived from anatase titania; and a minor amount of titania derived from a titanium chelate.

In one embodiment of the invention, there is provided a method for making a cobalt-containing catalyst precursor on a support comprising a major amount of titania and a minor amount of cobalt aluminate comprising one of:

(a) treating the support with a titanium chelate, calcining the so treated support at a temperature above about 250° C. whereby $TiO_2$ is formed from the titanium chelate, and then loading the calcined support with a cobalt compound; or (b) simultaneously treating the support with a titanium chelate and a cobalt compound and then calcining the so treated support with a temperature above about 250° C.

These and other embodiments of the invention will become apparent from the detailed description that follows.

DETAILED DESCRIPTION OF THE INVENTION

The support for the catalyst of the invention comprises a major amount of titania and a minor amount of a cobalt aluminate binder. Optionally, the support may contain silicon oxide or alumina binder, but preferably the support is substantially free of alumina. In general, the support will contain at least 50 wt % titania and preferably 80 wt % to 90 wt % titania. Preferably 60 to 98 wt % of the titania is in the rutile crystalline phase. The amount of cobalt aluminate in the binder is dependent upon the amount of cobalt and aluminum compounds used in forming the support. Suffice it to say that sufficient cobalt is present in the support to provide a cobalt/aluminum atomic ratio greater than 0.25, preferably from 0.5 to 2, and more preferably about 1. Thus, at a Co/Al ratio of 0.25 about half the aluminum oxide is present as cobalt aluminate. At a Co/Al ratio of 0.5 substantially all the alumina oxide present is present as cobalt aluminate. At Co/Al ratios above 0.5 the support will contain cobalt titanate in addition to cobalt aluminate and be essentially free of alumina. Preferably, the support will contain cobalt titanate, for example, about 4 to 12 wt % of the total weight of the support.

As previously stated the binder may also include alumina and optionally silica. In general, the binder is less than about 30 wt % of the support and preferably less than about 15 wt % of the support. Typically the binder is greater than about 3 wt % of the support. The amount of silica is less than 50 wt % of the total amount of binder, preferably 35 wt % of the binder.

Typically, the support will have a surface area in the range of from about 5 m$^2$/g to about 40 m$^2$/g and preferably from 10 m$^2$/g to 30 m$^2$/g. Pore volumes range from about 0.2 cc/g to about 0.5 cc/g and preferably from 0.3 cc/g to 0.4 cc/g.

The support is typically formed by spray drying a suitable aqueous slurry of titania, alumina binder material and optionally silica binder material into a purged chamber with heated air at an outlet temperature of about 105° C. to is 135° C. Spray drying produces a spherical support with a size range of about 20 to 120 microns. This spray dried support is then calcined at temperatures in the range of 400° C. to 800° C., preferably about 700° C. Next the calcined material is impregnated with an aqueous solution of a cobalt compound, preferably cobalt nitrate, in an amount sufficient to convert, upon calcination, at least part of the alumina to cobalt aluminate. Preferably, sufficient cobalt compound is used to convert from 50% to 99+% of the alumina to cobalt aluminate. Therefore, the amount of cobalt compound added during the preparation of the support will correspond to an atomic ratio of Co:Al in the range of 0.25:1 to 2:1 and preferably 0.5:1 to 1:1. Indeed, it is especially preferred that the support produced be substantially free of alumina.

Calcination of the cobalt impregnated support is typically conducted in air at temperatures in the range of about 700° C. to about 1000° C., preferably in the range of about 800° C. to about 900° C.

In one embodiment of the invention, the support is treated with sufficient water soluble titanium chelate to incorporate a minor amount of $TiO_2$ with the support upon calcination of the titanium chelate. Useful titanium chelates comprise those of one or more linear or branched organic carboxylic acids having 2 to about 10 carbon atoms. A preferred chelate is titanium lactate.

Titanium lactate is a water soluble salt that may be prepared in two forms: one having a single lactate ligand, and another having two lactate ligands. Either form is useful in the present invention.

Conveniently, the "titanate support" may be treated with the titanium lactate by impregnating the support with an aqueous solution of the titanium lactate and thereafter calcining the impregnated support in air at temperatures above about 250° C., preferably in the range of about 250 to about 500° C. for a time sufficient to convert the titania lactate to $TiO_2$. Generally, calcination will be conducted for about 30 minutes to about 24 hours.

The loading on the support of the $TiO_2$ derived from titanium lactate does not appear to be critical. Catalysts with added $TiO_2$ levels of 0.3 to 1.0 wt % have a similar beneficial effect on activity maintenance. A level of about 0.5 wt % $TiO_2$ after calcination of the titanium lactate is preferred.

When preparing Fischer-Tropsch catalyst precursors from this support, metals catalytically active for the Fischer-Tropsch synthesis are composited with the support. Preferred metals are those from Group VIII of the Periodic Chart of the Elements, particularly iron, cobalt and ruthenium, with cobalt and ruthenium being preferred and cobalt being most preferred. Promoters may also be employed such as zirconium, titanium, rhenium, hafnium, cerium, thorium and uranium, and other promoters well known to those skilled in the art. The metal or metals are present in amounts that are catalytically active for Fischer-Tropsch synthesis and will vary with the metal being selected. For example, ruthenium is much more active in this environment than cobalt and, as a consequence, is used in amounts ranging from about 0.5-3.0 wt % while cobalt will preferably be used in amounts of about 2-40 wt %, more preferably 5-30 wt %, still more preferably 10-25 wt %.

When promoters are employed, they are used in quantities less than the active catalytic metal, e.g., in weight ratios of about 1/20 to 1/10 based on the active metal. The most preferred catalysts are those containing cobalt and rhenium, cobalt and ruthenium, and cobalt and thoria, particularly cobalt and rhenium.

The catalyst can be prepared by a variety of techniques well known to those skilled in the art, including impregnation (either co-impregnation with promoters or serial impregnation—either by spray drying or by the incipient wetness techniques). Since a preferred catalyst for fixed bed Fischer-Tropsch processes is one wherein the catalytic metals are present in the outer portion of the catalyst particle, i.e., in a layer no more than 250 microns deep, preferably no more than 200 microns deep, a preferred method of preparing the catalyst is the spray method which is described in U.S. Pat. No. 5,140,050, incorporated herein by reference or in EP 0,266,898, incorporated herein by reference. For slurry Fischer-Tropsch processes, catalysts are preferably made by incipient wetness impregnation of spray-dried supports. When using the incipient wetness impregnation technique, organic impregnation aids are optionally employed. Such aids are described in U.S. Pat. No. 5,856,260, U.S. Pat. No. 5,856,261 and U.S. Pat. No. 5,863,856, all incorporated herein by reference.

Thus the support may be treated with a solution of the catalytic metal compound, or compounds, and then calcined. Typically, calcination will be in air at temperatures above about 250° C., preferably in the range of about 250° C. to about 500° C.

In the preferred case of a Fischer-Tropsch catalyst comprising cobalt and rhenium, the support is treated with a solution of cobalt nitrate and perrhenic acid in a Re:Co wt ratio in the range of about 0.005:1 to about 0.2:1.

In an alternate and preferred embodiment of the invention, the "titanate support" is treated with a solution of the catalytic metal compound or compounds that also contain titanium lactate and thereafter calcining the so treated support in air at a temperature above about 250° C.

The catalyst precursor is activated to provide a catalyst by contacting the precursor with a reducing-agent, typically hydrogen, at temperatures in the range of about 250° C. to about 550° C., and preferably about 275° C. to about 425° C. at pressures of from ambient to about 40 atm for times ranging from about 0.5 hours to about 24 hours.

The catalysts prepared according to the invention are particularly suitable for use in hydrocarbon synthesis via the Fischer-Tropsch synthesis process.

The Fischer-Tropsch synthesis is a well known process, and the reaction conditions have been described in the available literature. For example, temperatures may range from about 175° C. to about 400° C., preferably about 180° C. to 250° C., while pressures may range from about 1 to 100 bar, preferably about 15 to 40 bar. Hydrogen/CO ratios may range from 0.5/1 to about 4/1, preferably about 1.7/1 to 2.5/1, with the stoichiometric amount plus or minus about 3% being most preferred. The catalyst made from the support of this invention is preferably used in a slurry, e.g., a slurry bubble column reactor where gas hourly space velocities may range from about 1,000 to 25,000. A preferred slurry bubble column operation is described in U.S. Pat. No. 5,348,982, incorporated herein by reference. The products produced by the process of this invention generally follow the Schulz-Flory distribution, except that the yield of methane is usually higher than expected from this distribution. This indicates that methane is apparently produced by an additional mechanism.

The hydrocarbons produced in a process as described above are typically upgraded to more valuable products by subjecting all or a portion of the $C_{5+}$ hydrocarbons to fractionation and/or conversion. By "conversion" is meant one or more operations in which the molecular structure of at least a portion of the hydrocarbon is changed and includes both non-catalytic processing, e.g. steam cracking, and catalytic processing, e.g. catalytic cracking, in which the portion, or fraction, is contacted with a suitable catalyst. If hydrogen is present as a reactant, such process steps are typically referred to as hydroconversion and variously as hydroisomerization, hydrocracking, hydrodewaxing, hydrorefining and the like. More rigorous hydrorefining is typically referred to as hydrotreating. These reactions are conducted under conditions well documented in the literature for the hydroconversion of hydrocarbon feeds, including hydrocarbon feeds rich in paraffins. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels include gasoline, diesel fuel and jet fuel, while lubricating oil includes automotive oil, jet oil, turbine oil and the like. Industrial oils include well drilling fluids, agricultural oils, heat transfer oils and the like.

It is understood that various other embodiments and modifications in the practice of the invention will be apparent to, and can be readily made by, those of ordinary skill in the art without departing from the scope and spirit of the invention as described above. Accordingly, it is not intended that the scope of the claims appended hereto be limited to the exact description set forth above, but rather that the claims be construed as encompassing all of the features of patentable novelty that reside in the present invention, including all the features and embodiments that would be treated as equivalents thereof by those skilled in the art to which the invention pertains. The invention is further described in the following examples.

EXAMPLES

A. Preparation of Titanium Mono-Lactate.

A 293 gram portion of titanium isopropoxide was added to a stirred solution of 110 grams lactic acid and 200 grams isopropanol, followed by the addition of 350 grams de-ionized water. The mixture was gently heated in order to distill off the isopropanol, resulting in a final weight of 480 grams. This mixture was filtered through a 0.2 micron antek filter to remove a very small amount of solids. A 348 gram portion of the filtrate was diluted with 620 grams de-ionized water to produce the titanium lactate stock solution. The concentration of titanium in the solution was determined by adding sodium hydroxide to a small portion and recovering the precipitate by filtration. The precipitate was dried, calcined at 700° C., and weighed. The result of this analysis indicated that the titanium lactate stock solution contained 8.15 wt % equivalent of $TiO_2$.

B. Catalyst Preparation

A series of catalysts was prepared starting with a support prepared according to U.S. Pat. No. 6,117,814 by spray-drying Degussa P-25 $TiO_2$ with 6 wt % of a binder consisting of 9:1 wt ratio of alumina and silica. For Catalysts A to D listed in Table 1, the support was converted to a "titanate support" form by (a) calcining the spray-dried support at 700° C., (b) impregnating the support with about 6 wt % Co using an aqueous solution of cobalt nitrate; (c) calcining the impregnated support at 400° C. and (d) re-calcining at 871° C. to convert essentially all of the alumina binder to cobalt aluminate. For Catalysts E and F, the support was not treated with cobalt and was just calcined at 1000° C.

Catalysts were made by incipient wetness impregnation of an aqueous solution of cobalt nitrate (15 wt % Co) and perrhenic acid (0.09:1.0 wt ratio Re:Co) for all the catalysts except Catalyst E, which used ammonium perrhenate. After impregnation, the catalysts were calcined at 250° C. For Catalysts A, B and F, the impregnation solution also contained titanium lactate stock solution. The impregnation solution for Catalyst A also contained malonic acid with a molar ratio of malonic acid:cobalt of 0.3:1.0

Double impregnations and calcinations were applied to obtain the final loadings shown in Table 1.

TABLE 1

| Example No. | Wt % Co from Co aluminate | Wt % Co total on catalyst | Wt % Co on catalyst that is active | Wt % Re | Wt % TiO2 from Ti Lactate |
|---|---|---|---|---|---|
| A | 5.90 | 17.35 | 12.45 | 1.01 | 0.55 |
| B | 6.11 | 16.50 | 11.33 | 0.94 | 0.55 |
| C | 5.90 | 15.19 | 10.10 | 0.68 | 0 |
| D | 5.90 | 17.11 | 12.19 | 1.10 | 0 |
| E | 0 | 12.31 | 12.31 | 1.07 | 0 |
| F | 0 | 12.16 | 12.16 | 0.95 | 0.55 |

C. Activity Maintenance Determination

The catalysts in Table 1 were tested in extended runs in fixed bed units in order to determine activity maintenance. A charge of about 1.3 cc of catalyst diluted with quartz was reduced with hydrogen at 375° C., 280 psig for 1 hour. After start-up at low temperature, conditions were established that produced about 60 to 70% CO conversion at 215° C., 280 psig, GHSV of about 7200 cc gas at standard conditions per cc of catalyst per hour from a feed containing about 64% $H_2$, 31% CO, 3% Ar and 2% $N_2$. CO conversion was measured by GC using the $N_2$ as internal standard. An activity rate constant, K, was calculated based on the CO conversion, gas composition, temperature, pressure, and GHSV using an empirical, proprietary kinetic model. First order deactivation rates (half-lifes calculated from delta 1 n K per day) were based on rate data obtained from day 10 until the end of run. Results are summarized in Table 2. It is clear from the half-life data that the catalysts of this invention, A and B, are significantly more stable than the other catalysts. This advantage has been gained by the addition of a small amount of $TiO_2$ derived from titanium lactate, to the "titanate" form of the support. Example F, compared to E, shows no credit for titanium lactate addition to a base case rutile $TiO_2$—$Al_2O_3$—$SiO_2$ support.

TABLE 2

| Example No. | Wt % TiO2 from Ti Lactate | Relative Initial Activity, k | Halflife, days | Length of run, days |
|---|---|---|---|---|
| A | 0.55 | 1.10 | 296 | 57 |
| B | 0.55 | 0.91 | 296 | 57 |
| C | 0 | 1.03 | 164 | 30 |
|   |   | 0.98 | 162 | 57 |
| D | 0 | 1.35 | 140 | 32 |
|   |   | 1.20 | 221 | 57 |
| E | 0 | 1.05 | 117 | 18 |
|   |   | 0.92 | 144 | 60 |
| F | 0.55 | 1.05 | 111 | 56 |
|   |   | 1.03 | 128 | 56 |

What is claimed is:

1. A catalyst support composition comprising:
   a) a major amount of titania;
   b) a minor amount of a binder comprising cobalt aluminate, wherein the atomic ratio of cobalt to alumina is greater than 0.25; and
   c) about 0.3 wt % to about 1 wt %, based on the total weight of the support, of $TiO_2$, separate from component a), which has been derived from a deliberately added titanium lactate,
   wherein the catalyst support composition has an increased stability, as measured by an increased halflife, as compared to a comparative catalyst support composition lacking one or both of components b) and c).

2. The composition of claim 1 wherein the atomic ratio of cobalt to alumina is above 0.5.

3. The composition of claim 1 wherein the binder comprises about 3 wt % to about 15 wt % of the support.

4. The composition of claim 3 wherein the binder includes 0 wt % to 35 wt % of silica.

5. A catalyst comprising:
   a catalytically active metal or mixture of catalytically active metals, and the support of any one of claims 1, 2, 3, and 4, wherein the metals are selected from the group consisting essentially of cobalt, rhenium and mixtures thereof.

* * * * *